United States Patent
Edwards

(10) Patent No.: US 9,789,706 B2
(45) Date of Patent: Oct. 17, 2017

(54) REMOVABLE ULTRAVIOLET CURABLE DYE SUBLIMATION INKS

(71) Applicant: Electronics for Imaging, Inc., Fremont, CA (US)

(72) Inventor: Paul Andrew Edwards, Kalamazoo, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/683,846

(22) Filed: Apr. 10, 2015

(65) Prior Publication Data

US 2016/0297224 A1  Oct. 13, 2016

(51) Int. Cl.

| | | |
|---|---|---|
| *B41J 11/00* | (2006.01) | |
| *C09D 11/037* | (2014.01) | |
| *C09D 11/101* | (2014.01) | |
| *B41M 5/00* | (2006.01) | |
| *B41M 7/00* | (2006.01) | |

(52) U.S. Cl.
CPC ............ *B41J 11/002* (2013.01); *B41M 5/007* (2013.01); *B41M 5/0041* (2013.01); *B41M 5/0064* (2013.01); *B41M 7/009* (2013.01); *B41M 7/0081* (2013.01); *C09D 11/037* (2013.01); *C09D 11/101* (2013.01)

(58) Field of Classification Search
CPC .. B41M 5/0088; B41M 5/0082; B41M 5/035; B41M 5/00; B41M 5/382; B41M 5/0353; B41M 7/009; B41M 5/0064; B41M 5/007; B41M 7/0081; B41M 5/0041; B41J 11/002; C09D 11/037; C09D 11/101
See application file for complete search history.

(56) References Cited

U.S. PATENT DOCUMENTS

| | | |
|---|---|---|
| 6,254,216 B1 | 7/2001 | Arway et al. |
| 6,726,317 B2 | 4/2004 | Codos |
| 6,846,851 B2 | 1/2005 | Nakhmanovich et al. |
| 7,435,264 B2* | 10/2008 | Kiff .......................... D06P 5/12 428/88 |
| 8,337,007 B2 | 12/2012 | Wang et al. |
| 8,876,979 B2 | 11/2014 | Uptergrove et al. |
| 2002/0044188 A1* | 4/2002 | Codos ...................... B41J 2/01 347/106 |

(Continued)

FOREIGN PATENT DOCUMENTS

EP  0883026  12/1998

*Primary Examiner* — Henok Legesse
(74) *Attorney, Agent, or Firm* — Perkins Coie LLP

(57) ABSTRACT

Various of the disclosed embodiments concern removable ultraviolet (UV) curable dye sublimation ink to be used in various printing systems and printing methods. In some embodiments, the ink includes a dye component, a UV curable component, and a soluble or solvent-sensitive component. In order to print an image on a substrate, the ink is heated to a temperature sufficient to cause sublimation of at least the dye component. During the sublimation process, the dye is able to permeate the substrate and form a printed image. After the transfer process has been completed, a solvent can be jetted onto the substrate that causes the soluble component to dissolve. The washing process ensures that any residual ink remaining on the surface of the substrate is substantially removed.

20 Claims, 6 Drawing Sheets

(56) References Cited

U.S. PATENT DOCUMENTS

| | | | |
|---|---|---|---|
| 2005/0100705 A1* | 5/2005 | Kiff | D06P 5/12 |
| | | | 428/89 |
| 2007/0054211 A1 | 3/2007 | Hsieh et al. | |
| 2010/0304040 A1 | 12/2010 | Chretien et al. | |
| 2012/0194622 A1 | 8/2012 | Iraqi et al. | |
| 2013/0202858 A1 | 8/2013 | Shimohara | |
| 2016/0002848 A1* | 1/2016 | Roberts | B41M 5/0256 |
| | | | 8/471 |
| 2016/0297224 A1 | 10/2016 | Edwards | |
| 2016/0297225 A1* | 10/2016 | Edwards | B41M 5/0358 |

* cited by examiner

REMOVABLE ULTRAVIOLET CURABLE DYE SUBLIMATION INKS

RELATED FIELD

Various embodiments relate generally to ultraviolet (UV) curable dyes. More specifically, various embodiments relate to removable UV curable dye sublimation inks.

BACKGROUND

Dye sublimation inks have long been used for printing on polyester-based materials and objects. Conventionally, sublimation printing processes have used thermal printers and dye transfer paper and have employed analog printing methods. The dye sublimation inks include a pigment suspended in a liquid solvent, such as water. Inkjet inks and inkjet printers have also recently been used for sublimation printing processes.

The market for digital textile printing has grown substantially in recent years. This has led to increased usage of and interest in solvent-based, e.g. water-based, dye sublimation inks. Outside of textile applications, other polyester-based materials are also decorated using dye sublimation technology. Examples include films, containers, packaging, and materials having a polyester coating, such as wood or metal.

Two types of printing processes can be used in sublimation printing. Direct printing requires that ink is jetted directly onto a substrate, cured, and then thermally treated such that the dye diffuses from the ink into the substrate. Indirect printing requires that ink is printed onto heat-resistant transfer paper or another transfer material and cured, e.g. via UV radiation. The transfer paper is placed over a substrate and heat is applied that causes the dye to transfer to the substrate from the transfer paper and form an image.

Indirect printing is both more costly and more complex due to the presence of the transfer paper. Moreover, the transferring process can be materially hindered if the image is not printed onto a flat substrate.

While direct printing eliminates the need for transfer paper, problems arise related to the removal of residual ink that remains on the surface of the substrate following sublimation. If the substrate is flat and durable, it is possible to manually scrape the residual ink from the imaged substrate. However, the scraping process is difficult to effectively automate. In some instances, scraping may not be practical or possible. For example, if the substrate is soft or has surface flatness variability, it can be very difficult to remove residual ink.

SUMMARY

Introduced herein are systems and methods for sublimation printing that use a removable UV curable dye sublimation ink. Various embodiments of the ink formulation include a dye component, a UV curable component, and a soluble or solvent-sensitive component. Some embodiments include a dispersant, a surfactant, a stabilizer, a soluble monofunctional monomer, a hydrophobic monofunctional monomer, or some combination thereof. The ink formulations are designed to be easily removable, e.g. by a washing process, following sublimation.

Also introduced herein are printing systems that can be used to deposit, cure, and remove ink, including the aforementioned ink formulations. Various embodiments include a printer head configured to deposit ink on a substrate, a light source configured to cure the ink, a heating element that causes sublimation to begin, and a nozzle that jets solvent onto the substrate to remove unused residual ink. The light source can be configured to emit UV radiation of subtype V, subtype A, subtype B, subtype C, or some combination thereof. In some embodiments, the substrate includes polyester or has a polyester-based coating/spray applied prior to printing.

Also introduced herein are sublimation printing methods that use removable ink. Various embodiments of the method described herein include depositing ink directly onto a substrate, curing at least some of the ink, heating at least some of the ink to a temperature sufficient to cause sublimation, and jet a solvent onto the substrate that substantially removes residual ink that did not permeate the substrate during sublimation. Generally, the ink includes at least a dye component, an energy, e.g. UV, curable component, and a solvent or solvent-sensitive component. In some embodiments, the ink is a UV curable dye sublimation ink that is cured by a UV light source, e.g. UV light emitting diodes (LEDs).

DETAILED DESCRIPTION

Various embodiments are described herein that relate to removable UV curable dye sublimation inks. More specifically, various embodiments relate to printing systems and methods for removing residual UV curable dye sublimation ink that did not transfer to a substrate during the sublimation process.

Figure 1:
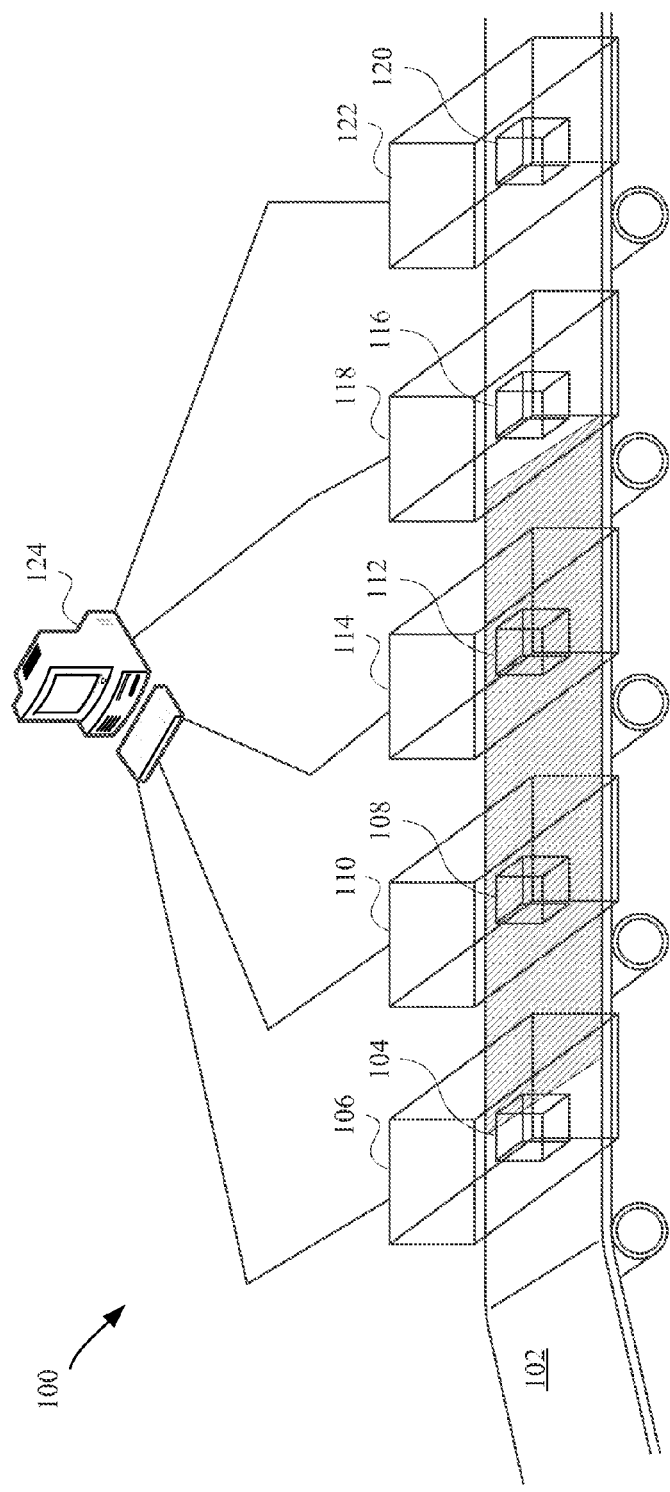
FIG. 1 is a diagrammatic perspective view of a printing system according to various embodiments of the disclosure.

FIG. 1 is a diagrammatic perspective view of a printing system 100 according to various embodiments of the disclosure. The printing system 100 includes a printer head 104, a light source 108, a heating element 112, a nozzle 116, and a dryer 120. Embodiments can include some or all of these components. For example, the dryer 120 may not be present in some embodiments.

The printer head 104 is configured to deposit ink onto the substrate 102. In some embodiments, the printer head 104 is an inkjet printer head that jets ink onto the substrate 102 using, for example, piezoelectric nozzles. Thermal print heads are generally avoided in an effort to avoid premature sublimation of the ink. In some embodiments, the ink is a solid energy, e.g. UV, curable ink. However, other inks may also be used, such as water-based energy curable inks or solvent-based energy curable inks. The ink can be deposited in different forms, such as ink droplets and colored polyester ribbons.

In some embodiments, one or more light sources 108 cure some or all of the ink deposited on the substrate 102 by emitting UV radiation. The light source(s) 108 may be, for example, a UV fluorescent bulb, a UV light emitting diode (LED), a low pressure, e.g. mercury (Hg), bulb, or an excited dimer (excimer) lamp and/or laser. Various combinations of these light sources could be used. For example, a printing system 100 may include a low-pressure Hg lamp and a UV LED. As will be discussed below with respect to FIG. 2, the light source 108 may be configured to emit UV radiation of a particular subtype.

The heating element 112 causes at least some of the dye within the ink deposited by the printer head 104 to sublime and permeate the substrate 102. The heating element 112 may be a heated plate/press or any other heating component that causes the area surrounding the ink to increase in temperature, e.g. heated streams of air. The heating element 112 can be configured to heat a segment of the substrate in its entirety or a localized portion of the substrate by applying heat directly to the ink's surface. However, in many instances not all of the ink will permeate the substrate 102. In fact, much of the ink deposited on the substrate 102 may be wasted in generating an image.

The nozzle 116 can eject or jet a solvent onto the surface of the substrate 102, thereby substantially removing residual ink that did not permeate the substrate 102 during the sublimation process. In some embodiments, the ink includes a soluble component that dissolves when exposed to the solvent. The solvent may be ejected at a predetermined pressure or a pressure specified by a user of the printing system 100. An appropriate pressure could be determined by considering factors such as substrate type/medium, ink formulation, solvent temperature, etc. While a higher pressure may be more efficient and/or effective in removing the residual ink from the substrate 102, it could potentially degrade the image, e.g. lower image quality.

In some embodiments, a dryer 120 removes any solvent remaining on the surface of the substrate 102. Accordingly, the dryer 120 is generally downstream of the nozzle 116 in the media feed direction, i.e. substrate is washed before being dried. Dryer 120, or an additional dryer, may be configured to remove water or solvent from a water-based ink formulation or a solvent-based ink formulation prior to curing or sublimating. For example, a distinct dryer may be located between the printer head 104 and the light source 108, such that the ink is dried, wholly or partially, prior to being exposed to UV radiation.

The printer head 104, light source 108, heating element 112, nozzle 116, and dryer 120 are illustrated as being directly adjacent to one another, i.e. neighboring without any intervening components. However, additional components that assist in printing, curing, subliming, etc., may also be present. That is, FIG. 1 illustrates one possible order in which the components may be arranged in order to print an image onto the substrate 102. Other embodiments are considered in which the order is rearranged, additional components are placed before, between, or after the illustrated components, etc.

In some embodiments, one or more of the aforementioned components are housed within one or more carriages. For example, the printer head 104 can be housed within a printing carriage 106, the light source 108 can be housed within a curing carriage 110, etc. In addition to protecting the components from damage, the carriages may also serve other benefits. For example, sublimation carriage 114 can limit the release of heat and limit the exposure of substrate during the sublimation process, washing carriage 118 can contain splashes and/or leakage of solvent, and drying carriage 122 can limit the amount of substrate 102 exposed to the dryer 120 at one time. The printing system 100 may comprise pulleys, motors, rails, and/or any combination of mechanical or electrical technologies that enable the carriages to travel along the substrate 102. In alternative embodiments, the carriages can be fixedly attached to a rail or base of the printing system 100. In these embodiments, the substrate 102 can be moved in relation to the printer head 104, light source 108, etc., such that ink can be deposited on the substrate 102.

Figure 6:
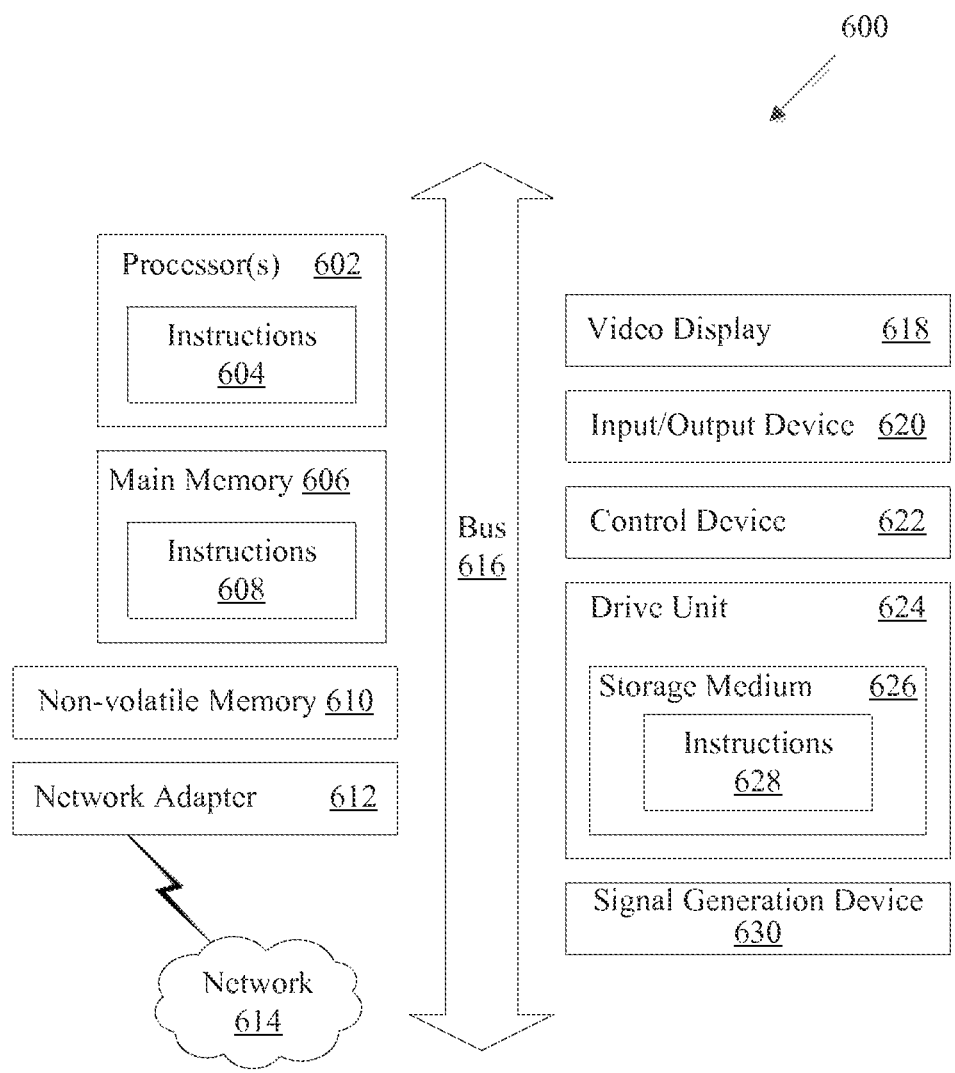
FIG. 6 is a block diagram illustrating an example of a computer system in which at least some of the operations described herein can be implemented.

In various embodiments, some or all of the components are controlled by a computer system, e.g. computer system 600 of FIG. 6. The computer system can allow a user to input printing instructions and information, modify print settings, alter the printing process, e.g. by increasing nozzle pressure, etc.

Figure 2:
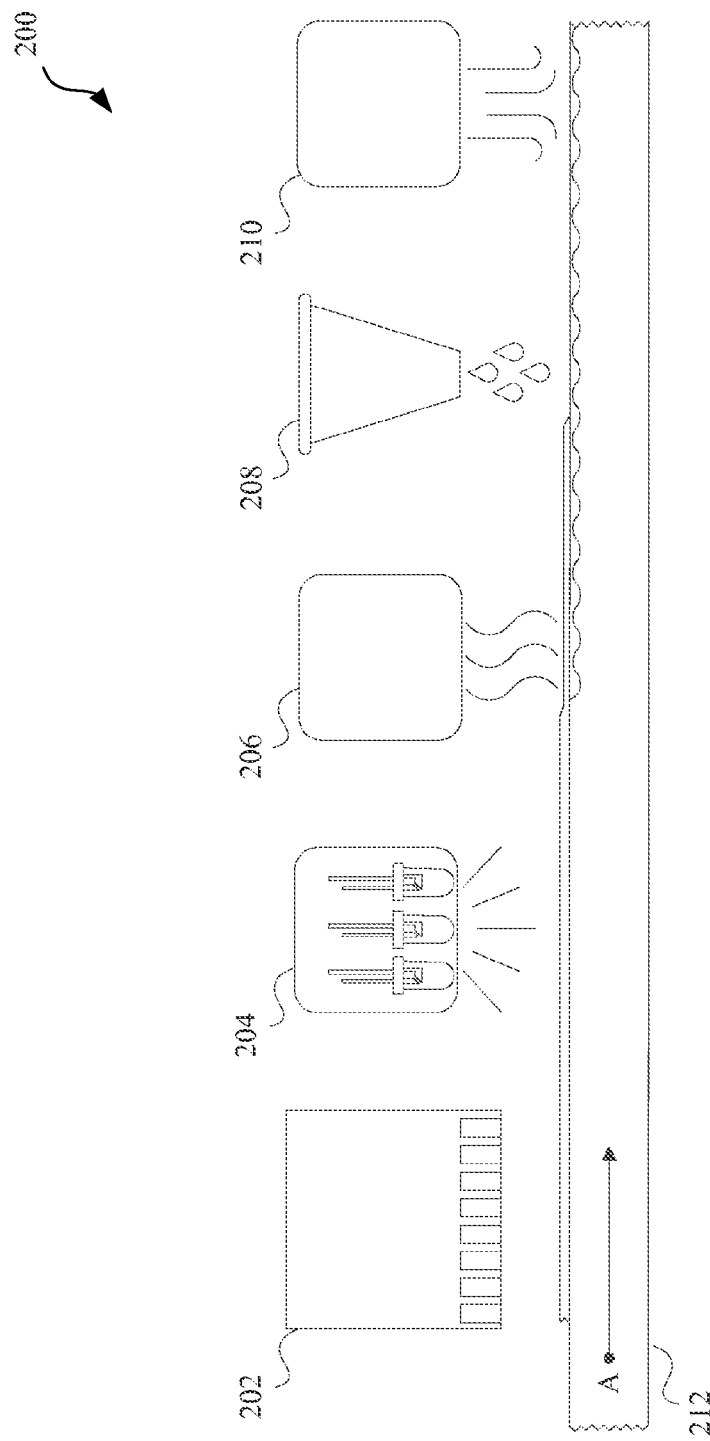
FIG. 2 is a side view of a printing system in accordance with various embodiments.

FIG. 2 is a side view of a printing system 200 in accordance with various embodiments. The printing system includes a printer head 202, light source 204, heating element 206, nozzle 208, and dryer 210. While a single-pass configuration is illustrated by FIG. 2, other embodiments may employ multi-pass, i.e. scan, configurations. Similarly, embodiments can be modified for various printers, e.g. flatbed printer, drum printer, lane printer. For example, a flatbed printer may include a stable bed and a traversing printer head, stable printer head and a traversing bed, etc.

The printer head 202 can include distinct ink/color drums, e.g. CMYK, or colored polyester ribbons that are deposited on the surface of a substrate 212. Path A represents the media feed direction, e.g. the direction in which the substrate 212 travels during the printing process.

The light source 204 cures some or all of the ink deposited on the substrate 212 by the printer head 202. In some embodiments, the light source 204 is configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments may characterize wavelengths of 285 nm as UVC.

The light source 204 may be, for example, a fluorescent bulb, a light emitting diode (LED), a low pressure, e.g. mercury (Hg), bulb, or an excited dimer (excimer) lamp/laser. Combinations of different light sources could be used in some embodiments. Generally, the light source 204 is selected to ensure that the curing temperature does not exceed the temperature at which the ink begins to sublime. For example, light source 204 of FIG. 2 is a UV LED lamp that generates low heat output and can be used for a wider range of substrate types. UV LED lamps are associated with lower power consumption, longer lifetimes, and more predictable power output.

Other curing processes may also be used, such as epoxy (resin) chemistries, flash curing, and electron beam technology. In some embodiments, a thermal curing process is implemented that involves a two-step process: first, curing the ink at a certain temperature, e.g., 100° C., and second, subliming the ink by raising the temperature, e.g., 200° C. One skilled in the art will appreciate that many different curing processes could be adopted that utilize specific timeframes, intensities, rates, etc. The intensity may increase or decrease linearly or non-linearly, e.g. exponentially, logarithmically. In some embodiments, the intensity may be altered using a variable resistor or alternatively by applying a pulse-width-modulated (PWM) signal to the diodes in the case of an LED light source.

A heating element 206 generates heat that causes at least some of the dye in the ink to sublimate. During sublimation, dye is able to leave the ink and permeate the substrate 212, where it re-solidifies. Once within the substrate 212, the dye becomes entirely or substantially insoluble. In some embodiments, the heating element 206 is a platen-style press or a rotary drum press.

The nozzle 208 is configured to jet one or more solvents onto the surface of the substrate 212 to wash away any residual ink, which contains a depleted level of dye, that did not transfer to the substrate 212. In some embodiments, the solvent is water or a water-based solution, and the ink is water-soluble or water-sensitive. The nozzle 208 can be configured to eject the solvent(s) at a particular pressure and/or temperature. For most solutes, e.g. soluble monomers, the higher the temperature of the solvent, the faster the solute dissolves. As such, the temperature of the solvent can play an important role in effectively removing excess ink from the surface of the substrate 212. In various embodiments, the nozzle 208 jets warm water onto the substrate 212 that is between 40° C. and 60° C. While higher temperatures can be used, recycling should be avoided, which begins to occur around 80° C. Temperatures below this range can also be used, although lower temperatures may result in decreased efficiency and/or effectiveness of the washing process.

In some embodiments, a dryer 210 removes all or substantially all of the solvent, e.g. water, remaining on the surface of the substrate. The type, location, etc., of the dryer 210 may be influenced by the ink formulation and/or substrate type used for printing. Various dryer configurations are possible, including one or more dryers attached to either side of a carriage, one or more stationary dryers positioned downstream in the media feed direction, or some combination thereof. In some embodiments, the dryer 210 applies an even distribution of heat, e.g. by warm jets of air, across the substrate 212 to ensure the ink is fully cured.

Figure 3:
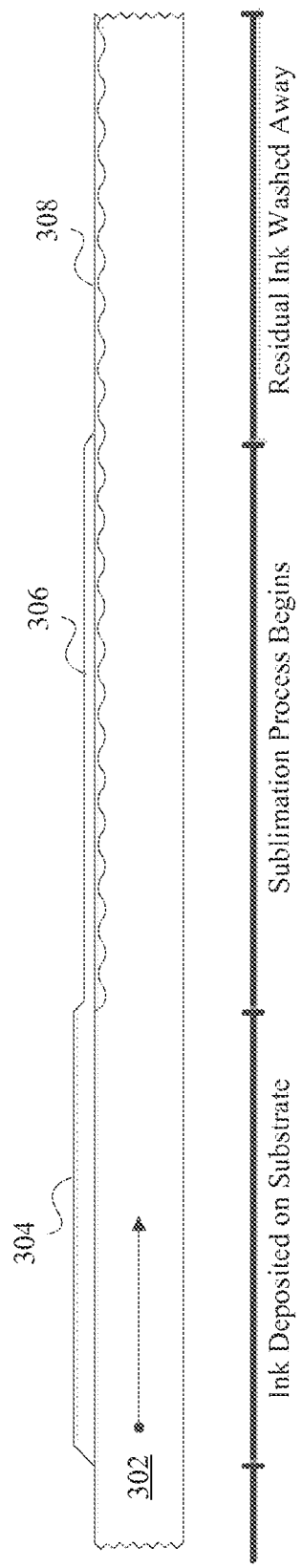
FIG. 3 is a side view of deposited ink on the surface of a substrate during various stages of a printing process in accordance with some embodiments.

FIG. 3 is a side view of deposited ink 304 on the surface of a substrate 302 during various stages of a printing process in accordance with some embodiments. As shown in FIG. 3, the surface of the substrate 302 is clean, i.e. free or substantially free of unwanted particles, prior to printing. The embodiments described herein are particularly valuable when printing onto substrates that have low absorbency, are soft, and/or have some surface structure or features. More specifically, the systems and methods described herein are attractive when scraping of excess ink is not possible or practical. However, the systems and methods described herein could be used to improve print quality for other printing processes and substrates, e.g. textiles, as well. In some embodiments, the substrate 302 is polyester or a polyester-coated material, such as an agglomerated stone material that includes marble, quartz, etc. "Agglomerated stone" is a subset of composite material that is also referred to as engineered stone.

Any ink 304 that is deposited by a printer head remains on the surface of the substrate 302 until sublimation begins. The ink 304 contains dye in a dispersed form that is not soluble within the ink 304. When effective ink formulations are designed, a number of factors are considered, including cross-linked density, ability to adhere to the substrate, and ink tack. Other factors can include the curing process utilized, substrate type, the application(s) for which the substrate is to be used, and the degree of solubility desired.

Standard UV inks are typically formulated to have good adhesion and surface cure characteristics. This is done by modifying the cross-linked density and altering what monomers present that adhere to the substrate. However, the ink formulations used by the printing systems and methods described herein need not be designed to exhibit great adhesion or rub resistance. These inks are meant to have a relatively short lifetime before being removed as part of the washing process.

As the sublimation process begins, i.e. deposited ink 304 is heated up, some of the dye or pigment within the ink 304 sublimes, or is converted into a gas, and permeates/diffuses into the substrate 302. The sublimed dye 308 re-solidifies within the substrate 302, thereby forming an image. Residual ink 306 that did not permeate the substrate 302 and remains on the surface of the substrate 302 can be removed by a washing process. Once the sublimed dye 308 is transferred to the substrate 203, the residual ink 306 contains a depleted level of dye.

Many of the ink formulations described herein are readily soluble and are designed to have low cross-linked density. This can be achieved using a combination of soluble monofunctional monomers, limiting reactions by modifying photoinitiator concentration, including soluble UV monomers, soluble photoinitiators, hydrophilic dispersants, etc. Sample ranges for a soluble dye sublimation ink formulation can be seen in Table 1. Various embodiments can include some or all of the listed items, as well as additional items not listed in Table 1. For example, some embodiments include a surfactant that improves an ink's weatherability, which refers to the ink's ability to maintain its appearance over time and resist wear, decay, etc. As another example, photoinitiator or surfactant may not be present in certain embodiments. The ink formulations may also contain multiple items of the same type, e.g. multiple photoinitiators that absorb different wavelengths.

TABLE 1

Possible ink formulations in accordance with some embodiments.
Sample Ranges for Dye Sublimation Ink Formulations - By Weight

| | |
|---|---|
| Dye | 3 to 6% |
| Dispersant | 3 to 6% |
| Photoinitiator | 2 to 8% |
| Surfactant | 0.5 to 2% |
| Stabilizer | 0.5 to 2% |
| Water Soluble Monofunctional Monomer | 40 to 80% |
| Hydrophobic Monofunctional Monomer | 10 to 50% |

Figure 4:
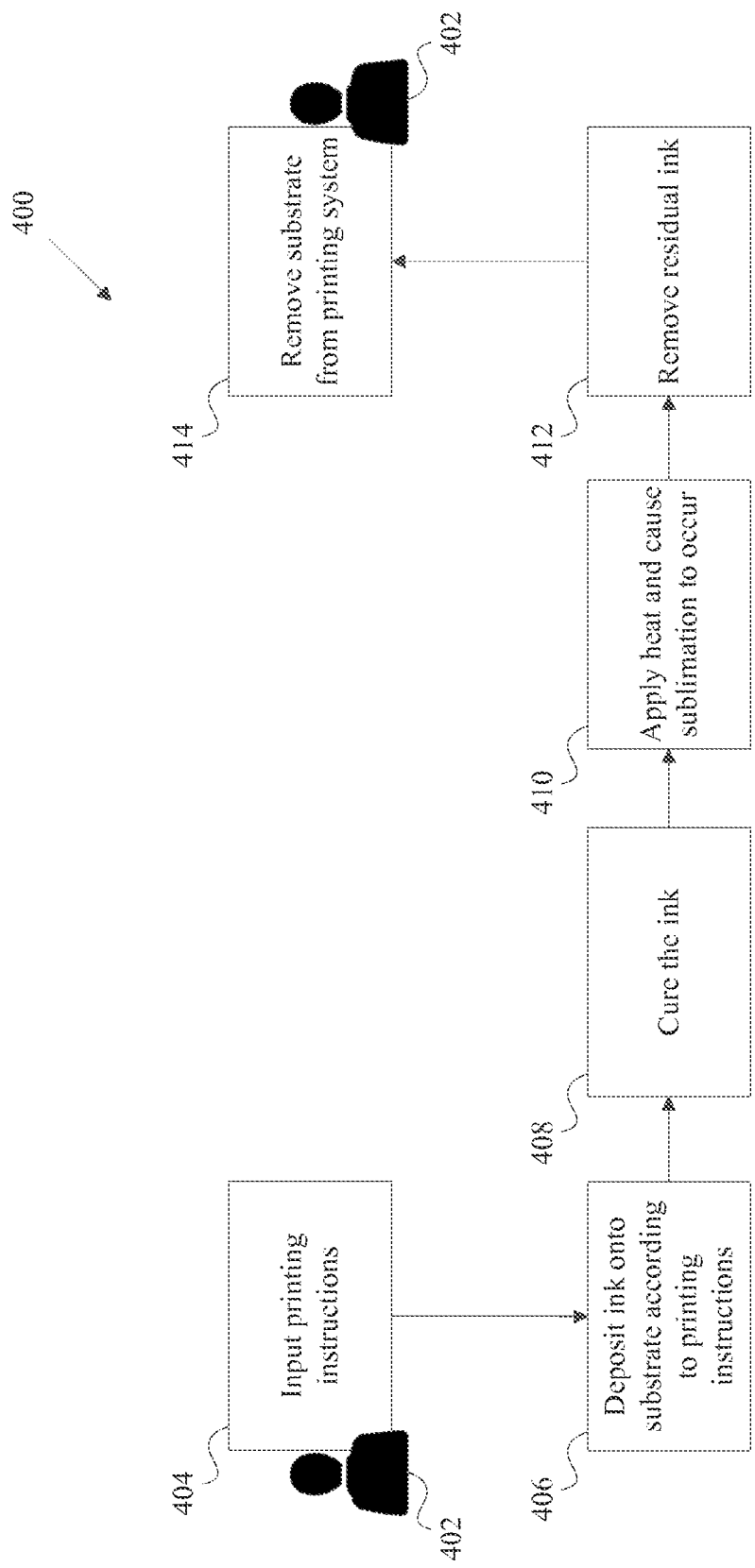
FIG. 4 is a block diagram illustrating an example process for printing using removable dye sublimation ink according to some embodiments.

FIG. 4 is a block diagram illustrating an example process 400 for printing using removable dye sublimation ink according to some embodiments. At block 404, a user 402 or system provides printing instructions to a printing system, e.g. printing system 100 of FIG. 1. In some embodiments, the user 402 inputs the instructions by interacting with a computer system, e.g. computer system 600 of FIG. 6. The computer system communicates the instructions through a local physical connection, e.g. universal serial bus (USB) connection, or a remote connection, e.g. local Wi-Fi network, Bluetooth peer to peer connection, an Internet service provider (ISP) coupled to the local Wi-Fi network via a router, or any combination thereof. Instructions can be stored locally, e.g. within a storage, or received from a remote database.

At block 406, the printing system begins printing an image by depositing ink on the surface of a substrate according to the printing instructions. The instructions can indicate where ink is to be deposited, what ink(s) or substrate(s) are to be used, etc. At block 408, the printing system can begin to cure any ink deposited on the surface of the substrate. For example, a UV LED light source can be used to cure UV curable dye sublimation ink. In some embodiments, the UV LED light source emits wavelengths within a certain range, e.g. UVC wavelengths. The range and/or UV subtype emitted by the light source may be selected to more effectively cure particular ink formulations used by the printing system. In various embodiments, ink is cured immediately or shortly after being deposited on the substrate.

At block 410, the printing system can heat the ink to a temperature that is sufficient to cause some or all of the dye component within the ink to sublime and permeate the surface of the substrate. The required temperature may vary depending on the ink formulation, substrate type, etc. The temperature must be high enough to cause the ink to sublimate, but not so high as to damage the substrate. At block 412, residual cured ink is removed in a washing process. The residual ink is any ink that did not permeate the substrate, i.e. remains on the surface of the substrate following sublimation. The residual ink contains a depleted level of dye following the sublimation process. The ink is generally soluble or solvent-sensitive, which allows the excess ink to be easily removed by applying a solvent, such as water. Although the residual ink is designed to dissolve during the washing process, the sublimed dye is not affected. Once transferred to the substrate, the sublimed dye is substantially insoluble with respect to the solvent used for washing. At block 414, the user 402 can remove the substrate, which includes the final image, from the printing system.

Figure 5:
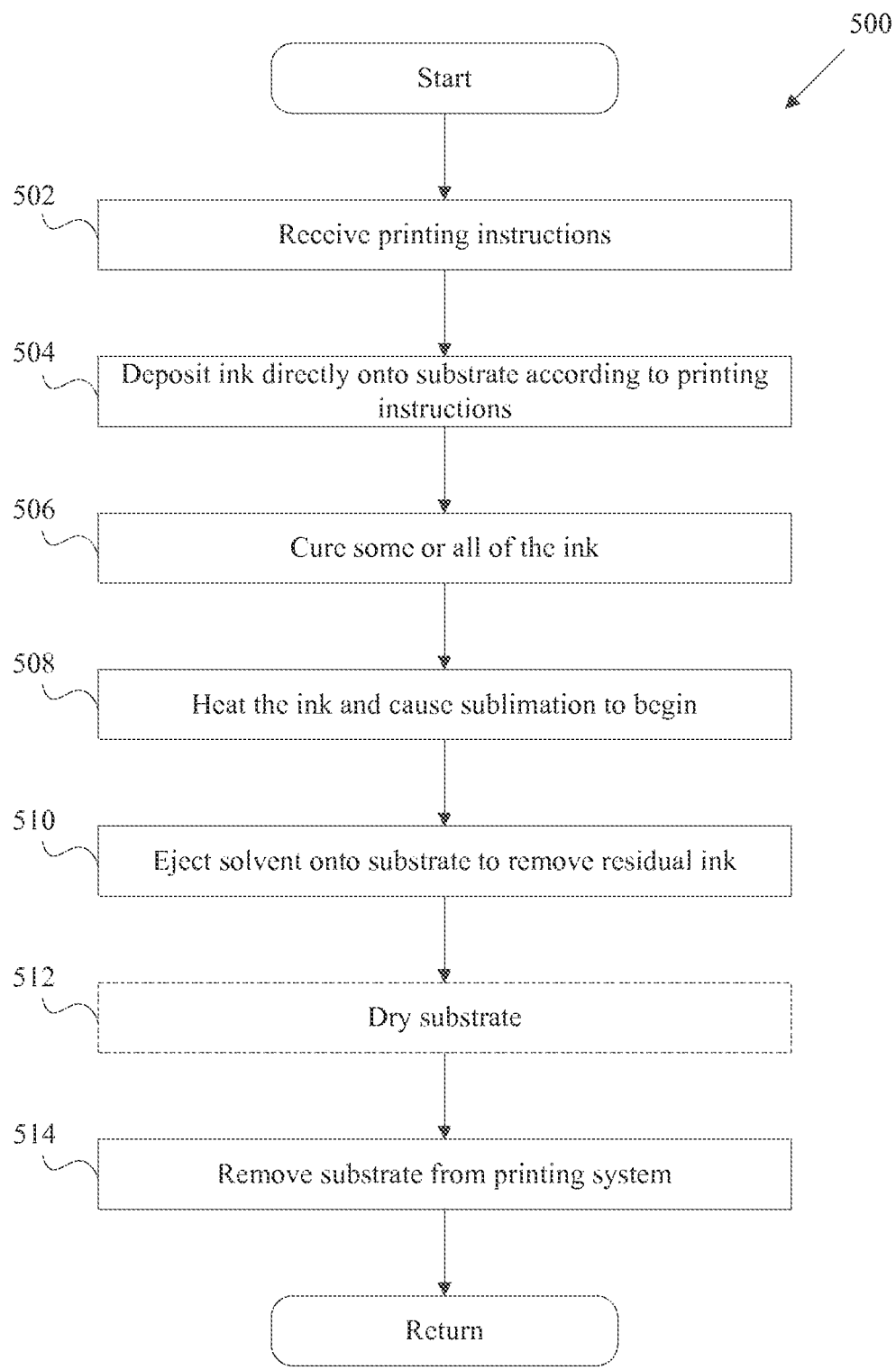
FIG. 5 is a flow diagram illustrating a process for printing using removable UV curable dye sublimation ink in accordance with various embodiments.

FIG. 5 is a flow diagram illustrating a process 500 for printing using removable UV curable dye sublimation ink in accordance with various embodiments. At block 502, instructions can be received by a printing system that contain information related to a variety of printing characteristics, including substrate type/media, ink, timing, etc. The printing characteristics can be used by a processor to determine whether the printing system is a candidate for certain printing, curing, and washing processes. At block 504, ink is deposited directly onto a substrate according to the instructions. Generally the substrate is non-porous and will absorb little, if any, of the ink. Some substrates, e.g. wood, metal, ceramic, glass, may require a polyester-based coating/spray be applied to the surface that allows sublimed ink to bind to the substrate. At block 506, the printing system cures some or all of the ink. For example, removable UV curable dye sublimation ink can be cured using a UV light source. As illustrated by FIG. 2, the UV light source may be one or more LEDs that produce little heat.

UV curable inks provides a number of benefits over conventional evaporative dye formulations. First, ink drops can be pinned/frozen fairly quickly by the curing process, which allows for better control of drop spread and improves image quality. Second, UV curable ink can be printed directly onto a much wider range of substrates, especially those with little or no absorption. UV curable inks, unlike many other formulations, are able to adhere to a wide variety of substrates. Third, UV curable ink can print onto a much wider range of substrates when using transfer media that do not require expensive coatings to work.

At block 508, the printing system heats the ink, which causes at least some of the dye to sublimate and form an image within the substrate. Because the ink has been applied directly onto the substrate, sublimation is able to effectively generate an image that is an accurate representation of what is desired. At block 510, residual ink is removed by a washing process once the transfer process has been completed. As described above, the washing process preferably uses a warm solvent, e.g. water, that is effective at dissolving soluble molecules/compounds or dispersing solvent-sensitive molecules/compounds within the ink. In some embodiments, the substrate can be dried, as shown at block 512. At block 514, the substrate, including the printed image, can be removed from the printing system, e.g. by a user who input the printing instructions.

FIG. 6 is a block diagram illustrating an example of a computer system 600 in which at least some of the operations described herein can be implemented. The computer system 600 may include one or more central processing units ("processors") 602, main memory 606, non-volatile memory 610, network adapter 612, e.g. network interfaces, video display 618, input/output devices 620, control device 622, e.g. keyboard and pointing devices, drive unit 624 including a storage medium 626, and signal generation device 630 that are communicatively connected to a bus 616.

The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a USB, IIC (I2C) bus, or an Institute of Electrical and Electronics Engineers (IEEE) standard 1394 bus, also called "Firewire."

The computer system 600 may be a server computer, a client computer, a personal computer (PC), a user device, a tablet PC, a laptop computer, a personal digital assistant (PDA), a cellular telephone, an Android, an iPhone, an iPad, a Blackberry, a processor, a telephone, a web appliance, a network router, switch or bridge, a console, a hand-held console, a (hand-held) gaming device, a music player, any portable/mobile hand-held device, wearable device, or any machine capable of executing a set of instructions, sequential or otherwise, that specify actions to be taken by that machine.

The main memory 606, non-volatile memory 610, and storage medium 626 are computer-readable storage media that may store instructions 604, 608, 628 that implement at least portions of various embodiments. The instructions 604, 608, 628 can be implemented as software and/or firmware to program processor(s) 602 to carry out the actions described above.

The network adapter 612 enables the computer system 600 to mediate data in a network 614 with an entity that is external to the computer device 600, through any known and/or convenient communications protocol. The network adapter 612 can include a network adaptor card, wireless network interface card, router, access point, wireless router, switch, multilayer switch, protocol converter, gateway, bridge, bridge router, hub, digital media receiver, and/or repeater.

The techniques introduced here can be implemented by, for example, programmable circuitry, e.g. one or more processors, programmed with software and/or firmware, entirely in special-purpose hardwired, i.e. non-programmable, circuitry, or in a combination of such forms. Special-purpose circuitry may be in the form of, for example, one or The printing systems, methods, and ink formulations described herein could also be used to print onto surfaces that have features and indentations that normally would prevent accurate sublimation, e.g. curves. In such instances, an image could be printed onto a flexible former material that is pressed onto the surface of the substrate. When heated, the dye is able to diffuse from the former material into the substrate.

The language used in the Detailed Description has been principally selected for readability and instructional purposes, and it may not have been selected to delineate or circumscribe the inventive subject matter. It is therefore intended that the scope of the technology be limited not by the Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method of dye-sublimation printing, the method comprising:
    depositing a sublimation ink including a dye component, an ultraviolet (UV) curable component, and a soluble monofunctional monomer component directly onto a surface of a substrate;
    curing at least the UV curable component by exposing the sublimation ink to UV radiation;
    heating the sublimation ink to a temperature that is sufficient to cause the dye component to sublime, permeate the surface of the substrate, and form an image; and
    ejecting a solvent onto the substrate that causes the soluble monofunctional monomer component to dissolve, thereby substantially removing residual sublimation ink that did not permeate the surface of the substrate and was not used to form the image.

2. The method of claim 1, further comprising:
    exposing the substrate to a dryer to remove any remaining solvent from the surface.

3. The method of claim 1, wherein the solvent is water.

4. The method of claim 3, wherein the soluble monofunctional monomer component is water-soluble.

5. The method of claim 1, wherein the sublimation ink further includes at least one dispersant, at least one initiator, at least one surfactant, and at least one stabilizer.

6. The method of claim 5, wherein the at least one initiator includes a free-radical photoinitiator adapted to decompose into free radicals when exposed to UV radiation, which promotes cross-linking within the sublimation ink.

7. The method of claim 1, wherein the UV radiation is emitted by one or more light emitting diodes.

8. The method of claim 7, wherein the one or more light emitting diodes are configured to emit UV electromagnetic radiation of subtype A, subtype B, subtype C, subtype V, or any combination thereof.

9. The method of claim 7, wherein the one or more light emitting diodes cure at least the UV curable component at a curing temperature less than the temperature sufficient to cause sublimation.

10. The method of claim 9, wherein the curing temperature does not exceed 100° C. (212° F.).

11. A solid ultraviolet (UV) curable dye-sublimation ink formulation comprising:
    a dye component configured to sublime and permeate into a substrate upon being heated to a sufficient temperature;
    a water-soluble monofunctional monomer component that allows residual ink that did not permeate the substrate during sublimation to be removed by a washing process; and
    a UV curable component that cures when exposed to UV radiation.

12. The solid UV curable dye-sublimation ink formulation of claim 11, further comprising:
    a dispersant that promotes distribution of the dye component throughout the ink formulation;
    a surfactant that affects surface properties of the ink formulation; and
    a stabilizer that improves weatherability of the ink formulation.

13. The solid UV curable dye-sublimation ink formulation of claim 11, further comprising:
    a hydrophobic monofunctional monomer component.

14. The solid UV curable dye-sublimation ink formulation of claim 13, wherein the water-soluble monofunctional monomer component and the hydrophobic monofunctional monomer component are selected to ensure the ink formulation lightly adheres to the substrate and is substantially tack free.

15. The solid UV curable dye-sublimation ink formulation of claim 11, wherein the UV curable component includes a photoinitiator selected to promote cross-linking when exposed to a particular range of UV radiation.

16. A method of dye-sublimation printing, the method comprising:
    depositing a sublimation ink including a dye component, a curable component, and a soluble monomer component directly onto a substrate;
    curing at least the curable component;
    heating the sublimation ink to a temperature that is sufficient to cause the dye component to sublime and permeate the substrate; and
    jetting a solvent onto the substrate that causes the soluble monomer component to dissolve, thereby substantially removing residual sublimation ink that did not permeate the substrate.

17. The method of claim 16, wherein the solvent is water.

18. The method of claim 16, wherein the solvent is between 40° C. (104° F.) and 60° C. (140° F.).

19. The method of claim 16, wherein the substrate is an agglomerated stone material that includes marble or quartz.

20. The method of claim 16, wherein the substrate is a polyester substrate or a polyester-coated non-absorbent substrate.

* * * * *